(12) United States Patent
Singh et al.

(10) Patent No.: US 11,548,324 B2
(45) Date of Patent: Jan. 10, 2023

(54) TIRE WEAR STATE ESTIMATION SYSTEM AND METHOD EMPLOYING FOOTPRINT LENGTH

(71) Applicant: The Goodyear Tire & Rubber Company, Akron, OH (US)

(72) Inventors: Kanwar Bharat Singh, Lorenztweiler (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 412 days.

(21) Appl. No.: 16/998,341

(22) Filed: Aug. 20, 2020

(65) Prior Publication Data

US 2021/0061022 A1   Mar. 4, 2021

Related U.S. Application Data

(60) Provisional application No. 62/893,852, filed on Aug. 30, 2019.

(51) Int. Cl.
*B60C 11/24* (2006.01)
*B60C 19/00* (2006.01)
(Continued)

(52) U.S. Cl.
CPC .......... *B60C 11/246* (2013.01); *B60C 11/243* (2013.01); *B60C 19/00* (2013.01);
(Continued)

(58) Field of Classification Search
None
See application file for complete search history.

(56) References Cited

U.S. PATENT DOCUMENTS

| 5,749,984 A | 5/1998 | Frey et al. |
| 5,864,056 A | 1/1999 | Bell et al. |

(Continued)

FOREIGN PATENT DOCUMENTS

| CN | 101183402 A | 5/2008 |
| CN | 106248401 A | 12/2016 |

(Continued)

OTHER PUBLICATIONS

EPO search report received by Applicant dated Dec. 2, 2020.
(Continued)

*Primary Examiner* — Peter J Macchiarolo
*Assistant Examiner* — Jermaine L Jenkins
(74) *Attorney, Agent, or Firm* — Edward T. Kennedy (57) ABSTRACT

A tire wear state estimation system includes a tire that supports a vehicle. A sensor unit is mounted on the tire and includes a footprint centerline length measurement sensor, a pressure sensor, a temperature sensor, and electronic memory capacity for storing identification information for the tire. A processor is in electronic communication with the sensor unit and receives the measured centerline length, the measured pressure, the measured temperature and the identification information. A tire construction database stores tire construction data and is in electronic communication with the processor. The identification information is correlated to the tire construction data. An analysis module is stored on the processor and receives the measured centerline length, the measure pressure, the measured temperature, the identification information, and the tire construction data as inputs. The analysis module includes a prediction model that generates an estimated wear state for the tire from the inputs.

20 Claims, 5 Drawing Sheets

(51) Int. Cl.
*B60C 23/04* (2006.01)
*G01M 17/02* (2006.01)

(52) U.S. Cl.
CPC ........ *B60C 23/04* (2013.01); *B60C 2019/004* (2013.01); *G01M 17/02* (2013.01)

(56) References Cited

U.S. PATENT DOCUMENTS

| | | | |
|---|---|---|---|
| 6,083,268 | A | 7/2000 | Kelsey et al. |
| 6,430,993 | B1 | 8/2002 | Seta |
| 6,532,812 | B2 | 3/2003 | King |
| 6,591,668 | B1 | 7/2003 | Becherer et al. |
| 6,883,962 | B2 | 4/2005 | Kurata |
| 7,158,018 | B2 | 1/2007 | Schick |
| 7,299,694 | B2 | 11/2007 | Byrne |
| 7,404,318 | B2 | 7/2008 | Merino-Lopez et al. |
| 7,523,656 | B1 | 4/2009 | Blixhavn et al. |
| 7,543,491 | B2 | 6/2009 | Hammerschmidt et al. |
| 7,568,384 | B2 | 8/2009 | Morinaga |
| 7,577,532 | B2 | 8/2009 | Ichikawa et al. |
| 7,673,505 | B2 | 3/2010 | Hammerschmidt |
| 7,680,610 | B2 | 3/2010 | Miyashita et al. |
| 7,755,367 | B2 | 7/2010 | Schoen et al. |
| 8,049,515 | B2 | 11/2011 | Schoen et al. |
| 8,065,911 | B2 | 11/2011 | Taylor et al. |
| 8,096,172 | B2 | 1/2012 | Gotschlich |
| 8,371,159 | B2 | 2/2013 | Morinaga |
| 8,402,821 | B2 | 3/2013 | Fink et al. |
| 8,443,660 | B2 | 5/2013 | Grande et al. |
| 8,483,976 | B2 | 7/2013 | Morinaga |
| 8,555,698 | B2 | 10/2013 | Neugebauer et al. |
| 8,558,680 | B2 | 10/2013 | Pannek |
| 8,775,017 | B2 | 7/2014 | Brusarosco et al. |
| 8,794,058 | B2 | 8/2014 | Bigot et al. |
| 8,833,410 | B2 | 9/2014 | Paturle |
| 8,849,500 | B2 * | 9/2014 | Gokyu ................. G01M 17/02 73/146 |
| 8,881,573 | B2 | 11/2014 | Paturle et al. |
| 8,892,298 | B2 | 11/2014 | Paturle et al. |
| 8,904,869 | B2 | 12/2014 | Paturle |
| 9,052,257 | B2 | 6/2015 | Shibata |
| 9,423,320 | B2 | 8/2016 | Kuramoto et al. |
| 9,513,192 | B2 | 12/2016 | Kretschmann et al. |
| 9,669,664 | B2 | 6/2017 | Kretschmann |
| 9,873,293 | B2 | 1/2018 | Singh et al. |
| 9,908,374 | B2 | 3/2018 | Dussinger et al. |
| 9,921,134 | B2 | 3/2018 | Unterreiner et al. |
| 9,962,999 | B2 | 5/2018 | Roty |
| 9,963,146 | B2 | 5/2018 | Singh et al. |
| 9,994,082 | B2 | 6/2018 | Seboe et al. |
| 10,000,100 | B2 | 6/2018 | Weston |
| 10,005,328 | B2 | 6/2018 | Makino et al. |
| 10,024,765 | B2 | 7/2018 | Neau |
| 10,082,381 | B2 | 9/2018 | McMillen |
| 10,112,444 | B2 | 10/2018 | Takahashi et al. |
| 10,132,719 | B2 | 11/2018 | Fudulea |
| 10,207,551 | B2 | 2/2019 | Benbouhout et al. |
| 10,222,299 | B2 | 3/2019 | Ledoux |
| 10,245,906 | B2 | 4/2019 | Singh et al. |
| 10,252,583 | B2 | 4/2019 | Kandler et al. |
| 10,259,274 | B2 | 4/2019 | Lange et al. |
| 10,286,734 | B2 | 5/2019 | Masago |
| 10,286,735 | B2 | 5/2019 | Guinart et al. |
| 10,328,755 | B2 | 6/2019 | Tebano et al. |
| 10,350,949 | B2 | 7/2019 | Surendra |
| 10,399,396 | B2 | 9/2019 | Limbrunner et al. |
| 10,471,779 | B2 | 11/2019 | Masago |
| 10,495,457 | B2 | 12/2019 | Cyllik et al. |
| 10,513,156 | B2 | 12/2019 | Hrabal |
| 10,603,962 | B2 | 3/2020 | Singh |
| 2004/0049303 | A1 | 3/2004 | Levy et al. |
| 2006/0114107 | A1 | 6/2006 | Kim et al. |
| 2012/0273102 | A1 | 11/2012 | Paturle |
| 2015/0040656 | A1 | 2/2015 | Singh et al. |
| 2015/0247780 | A1 | 9/2015 | Kretschmann et al. |
| 2017/0124784 | A1 | 5/2017 | Wittman et al. |
| 2018/0066929 | A1 | 3/2018 | Kandler et al. |
| 2018/0154707 | A1 | 6/2018 | Singh |
| 2018/0180463 | A1 | 6/2018 | Cyllik et al. |
| 2018/0253109 | A1 | 9/2018 | Fontaine et al. |
| 2019/0025113 | A1 | 1/2019 | Masago |
| 2019/0184763 | A1 | 6/2019 | Pulford et al. |
| 2019/0193479 | A1 | 6/2019 | Pulford et al. |
| 2019/0304084 | A1 | 10/2019 | Oblizajek |
| 2019/0382034 | A1 | 12/2019 | Miller et al. |
| 2020/0001662 | A1 | 1/2020 | Storti et al. |
| 2020/0023693 | A1 | 1/2020 | Ochi et al. |
| 2020/0031183 | A1 | 1/2020 | Kim |
| 2020/0047571 | A1 | 2/2020 | Oblizajek |
| 2020/0062268 | A1 | 2/2020 | Steiner |
| 2020/0070589 | A1 | 3/2020 | Kuerzl et al. |
| 2020/0094634 | A1 | 3/2020 | Decoster et al. |
| 2020/0126323 | A1 | 4/2020 | Ledoux et al. |
| 2020/0182746 | A1 * | 6/2020 | Singh ..................... G01P 15/18 |
| 2021/0008933 | A1 | 1/2021 | Kretschmann et al. |

FOREIGN PATENT DOCUMENTS

| | | |
|---|---|---|
| CN | 109472885 A | 3/2019 |
| DE | 102013208553 A1 | 11/2014 |
| DE | 102013220882 A1 | 4/2015 |
| DE | 102014214626 A1 | 1/2016 |
| DE | 102017221142 A1 | 5/2019 |
| EP | 3318422 A1 | 5/2018 |
| JP | 2013169816 A | 9/2013 |
| JP | 2016137847 A | 8/2016 |
| WO | 2015055429 A1 | 4/2015 |
| WO | 2019186353 A1 | 10/2019 |
| WO | 2019239305 A3 | 2/2020 |
| WO | 2020070051 A1 | 4/2020 |

OTHER PUBLICATIONS

Zhou Haibin, Prediction of wear life of engineering tires, Prediction of wear life of engineering tires, Jun. 30, 2004, 36-40, 46, 6, World Rubber Industry.

Zhu Chunxia, et al, Computer simulation of radial tire wear, Computer simulation of radial tire wear, Feb. 1, 2008, 57-58, 2, Research on Agricultural Mechanization.

* cited by examiner

TIRE WEAR STATE ESTIMATION SYSTEM AND METHOD EMPLOYING FOOTPRINT LENGTH

FIELD OF THE INVENTION

The invention relates generally to tire monitoring systems. More particularly, the invention relates to systems that predict tire wear. Specifically, the invention is directed to a system and method for estimating tire wear state based upon a change in the length of the footprint of the tire.

BACKGROUND OF THE INVENTION

Tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably.

One approach to the monitoring and/or measurement of tread wear has been through the use of wear sensors disposed in the tire tread, which has been referred to as a direct method or approach. The direct approach to measuring tire wear from tire-mounted sensors has multiple challenges. Placing the sensors in an uncured or "green" tire to then be cured at high temperatures may cause damage to the wear sensors. In addition, sensor durability can prove to be an issue in meeting the millions of cycles requirement for tires. Moreover, wear sensors in a direct measurement approach must be small enough not to cause any uniformity problems as the tire rotates at high speeds. Finally, wear sensors can be expensive and add significantly to the cost of the tire.

Due to such challenges, alternative approaches have been developed, which involve prediction of tread wear over the life of the tire, including indirect estimations of the tire wear state. These alternative approaches have experienced certain disadvantages in the prior art due to a lack of optimum prediction techniques, which reduces the accuracy and/or reliability of the tread wear predictions. For example, many such techniques involve data or information that is not easily obtained, such as non-standard vehicle system signals, or data that is not accurate under all driving conditions.

In addition, certain prior art techniques of indirectly estimating tire wear involve obtaining data from the vehicle controller area network, which is referred to in the art as the vehicle CAN bus. It may be undesirably difficult to access or utilize the vehicle CAN bus in an economical and reliable manner.

As a result, there is a need in the art for a system and method that accurately and reliably estimates tire wear state using easily obtained and accurate parameters, and which can operate independently of the vehicle CAN bus.

SUMMARY OF THE INVENTION

According to an aspect of an exemplary embodiment of the invention, a tire wear state estimation system is provided. The system includes a vehicle and a tire that supports the vehicle. A sensor unit is mounted on the tire and includes a footprint centerline length measurement sensor to measure a centerline length of a footprint of the tire, a pressure sensor to measure a pressure of the tire, a temperature sensor to measure a temperature of the tire, and electronic memory capacity for storing identification information for the tire. A processor is in electronic communication with the sensor unit and receives the measured centerline length, the measured pressure, the measured temperature and the identification information. A tire construction database stores tire construction data and is in electronic communication with the processor. The identification information is correlated to the tire construction data. An analysis module is stored on the processor and receives the measured centerline length, the measured pressure, the measured temperature, the identification information, and the tire construction data as inputs. The analysis module includes a prediction model that generates an estimated wear state for the tire from the inputs.

According to another aspect of an exemplary embodiment of the invention, a method for estimating the wear state of a tire supporting a vehicle is provided. The method includes the steps of mounting a sensor unit on the tire, measuring a footprint centerline length of the tire with the sensor unit, measuring a pressure of the tire with the sensor unit, measuring a temperature of the tire with the sensor unit, and storing identification information for the tire in the sensor unit. The measured centerline length, the measured pressure, the measured temperature and the identification information are received in a processor. Tire construction data is stored in a tire construction database that is in electronic communication with the processor, and the identification information is correlated to the tire construction data. An analysis module is stored on the processor, and the analysis module receives the measured centerline length, the measured pressure, the measured temperature, the identification information, and the tire construction data as inputs. An estimated wear state for the tire is generated from the inputs with a prediction model in the analysis module.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

With reference to FIGS. 1 through 6, an exemplary embodiment of the tire wear state estimation system of the present invention is indicated at 10. The tire wear state estimation system 10 and accompanying method attempts to overcome the challenges posed by prior art methods that measure the tire wear state through direct sensor measurements. As such, the subject system and method is referred herein as an "indirect" wear sensing system and method that estimates wear state. The prior art direct approach to measuring tire wear from tire-mounted sensors has multiple challenges, which are described above. The tire wear estimation state system 10 and accompanying method utilize an indirect approach and avoid the problems attendant use of tire wear sensors mounted directly to the tire tread.

Figure 1:
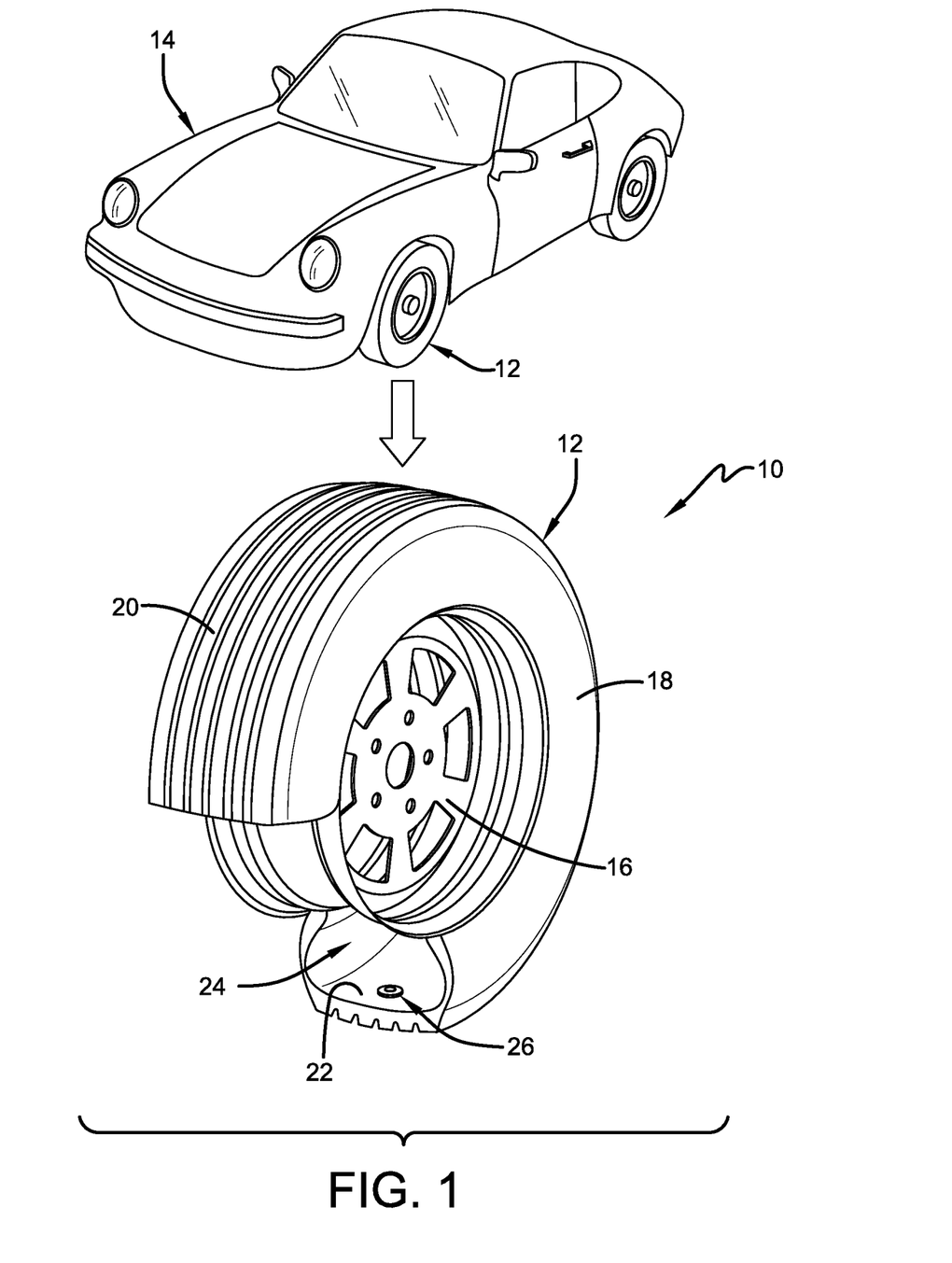
FIG. 1 is a schematic perspective view of a vehicle that includes a tire employing an exemplary embodiment of the tire wear state estimation system of the present invention.

With particular reference to FIG. 1, the system 10 estimates the tread wear on each tire 12 supporting a vehicle 14. While the vehicle 14 is depicted as a passenger car, the invention is not to be so restricted. The principles of the invention find application in other vehicle categories, such as commercial trucks, in which vehicles may be supported by more or fewer tires than those shown in FIG. 1.

The tires 12 are of conventional construction, and each tire is mounted on a respective wheel 16 as known to those skilled in the art. Each tire 12 includes a pair of sidewalls 18 (only one shown) that extend to a circumferential tread 20, which wears with age from road abrasion. An innerliner 22 is disposed on the inner surface of the tire 12, and when the tire is mounted on the wheel 16, an internal cavity 24 is formed, which is filled with a pressurized fluid, such as air.

A sensor unit 26 is attached to the innerliner 22 of each tire 12 by means such as an adhesive, and measures certain parameters or conditions of the tire as will be described in greater detail below. It is to be understood that the sensor unit 26 may be attached in such a manner, or to other components of the tire 12, such as on or in one of the sidewalls 18, on or in the tread 20, on the wheel 16, and/or a combination thereof. For the purpose of convenience, reference herein shall be made to mounting of the sensor unit 26 on the tire 12, with the understanding that such mounting includes all such attachment.

The sensor unit 26 is mounted on each tire 12 for the purpose of detecting certain real-time tire parameters, such as tire pressure 38 (FIG. 4) and temperature 40. For this reason, the sensor unit 26 preferably includes a pressure sensor and a temperature sensor, and may be of any known configuration.

Figure 4:
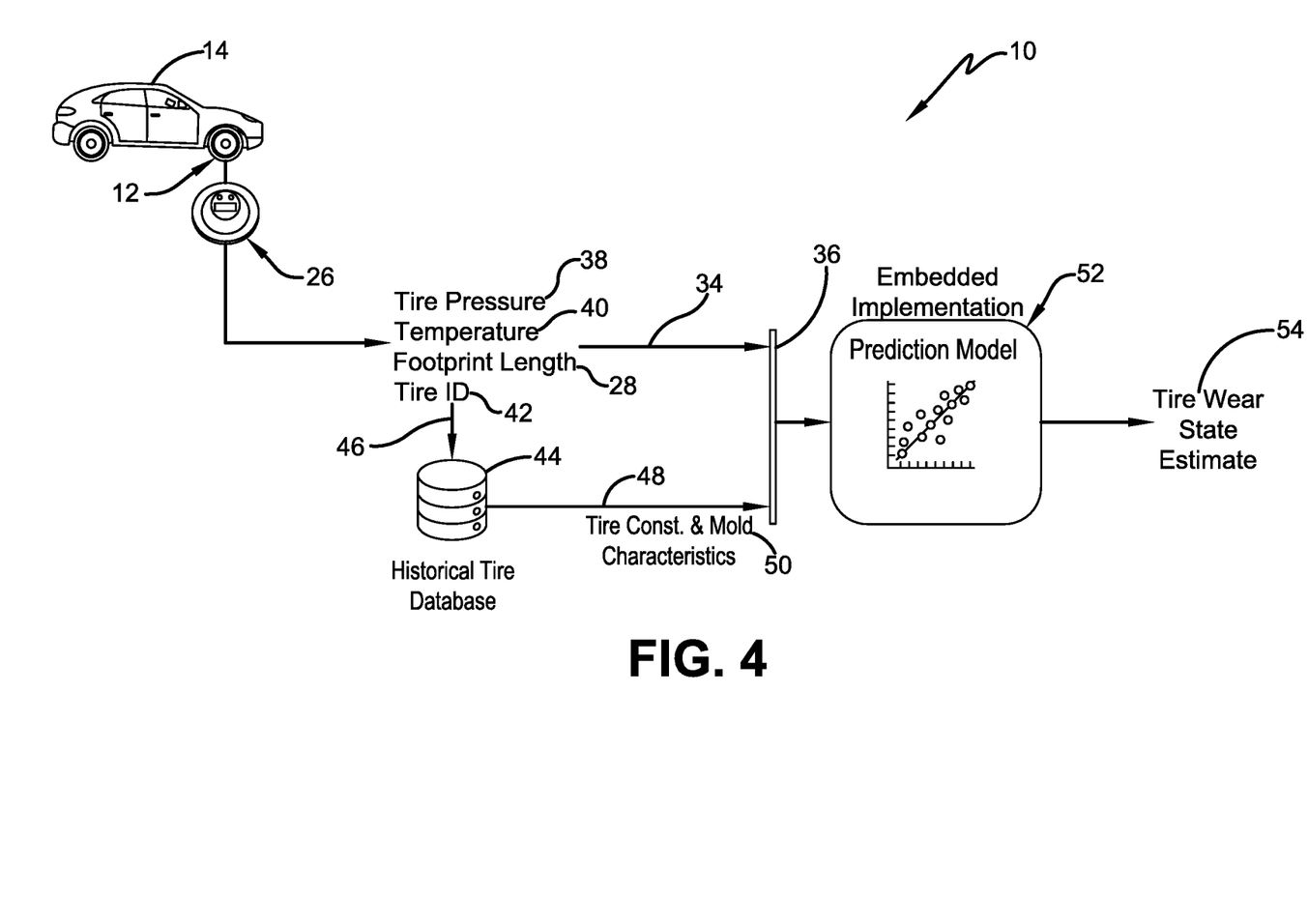
FIG. 4 is a schematic diagram of aspects of an exemplary embodiment of the tire wear state estimation system of the present invention.

The sensor unit 26 preferably also includes electronic memory capacity for storing identification (ID) information for each tire 12, known as tire ID information and indicated at 42 (FIG. 4). Alternatively, tire ID information 42 may be included in another sensor unit, or in a separate tire ID storage medium, such as a tire ID tag, which preferably is in electronic communication with the sensor unit 26. The tire ID information 42 may include tire parameter and/or manufacturing information, which will be described in greater detail below.

Figure 2:
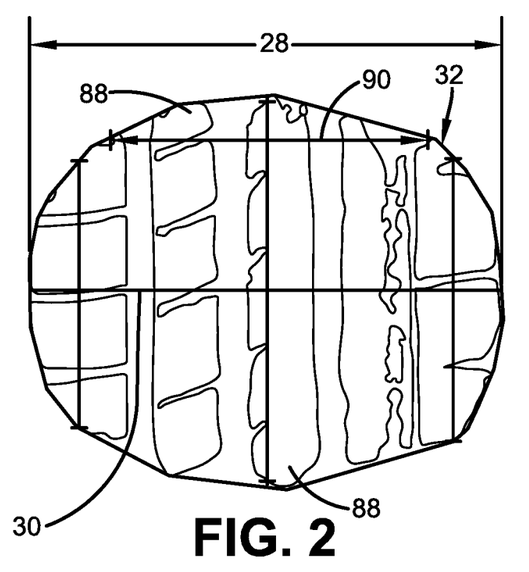
FIG. 2 is a plan view of a footprint of the tire shown in FIG. 1 in a new condition.

Turning to FIG. 2, the sensor unit 26 (FIG. 1) preferably also measures a length 28 of a centerline 30 of a footprint 32 of the tire 12. More particularly, as the tire 12 contacts the ground, the area of contact created by the tread 20 with the ground is known as the footprint 32. The centerline 30 of the footprint 32 corresponds to the equatorial centerplane of the tire 12, which is the plane that is perpendicular to the axis of rotation of the tire and which passes through the center of the tread 20. The sensor unit 26 thus measures the length 28 of the centerline 30 of the tire footprint 32, which is referred to herein as the footprint centerline length 28. Any suitable technique for measuring the footprint centerline length 28 may be employed by the sensor unit 26. For example, the sensor unit 26 may include a strain sensor or piezoelectric sensor that measures deformation of the tread 20 and thus indicates the centerline length 28.

Figure 3:
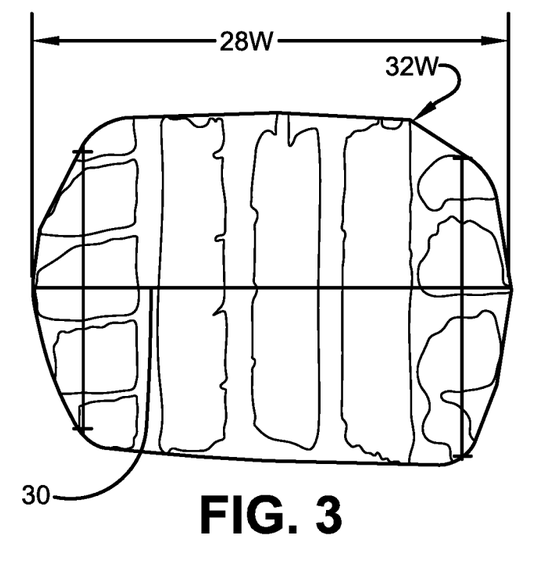
FIG. 3 is a plan view of a footprint of the tire shown in FIG. 1 in a worn condition.

It has been observed that, as the tire 12 wears, the centerline length 28 decreases. For example, the footprint 32 shown in FIG. 2 corresponds to a tire 12 in a new condition without tire wear. FIG. 3 shows the footprint of the same tire 12 in a worn state or condition after traveling about 21,000 kilometers (km). After such travel, the tire 12 experienced about a 30 percent (%) reduction of tread depth, as shown by the footprint after wear, indicated at 32$w$, and a decrease of about 6% in the centerline length, indicated by 28$w$, when compared to the new condition shown in FIG. 2. This observation indicates that the centerline length 28, 28$w$ may be an indicator of the wear state of the tire 12.

Further testing confirmed this observation, showing a reduction of centerline length 28 corresponding to wear of the tire 12, including up to a 20% decrease in the centerline length when the tread depth was reduced by 100%, or completely reduced to a legal limit. It is to be understood that the sensor unit 26 measures the centerline length 28, 28$w$ of the tire 12 at a certain point in time, and for the purpose of convenience, any such measurement shall be referred to as the centerline length 28.

It is to be understood that the pressure sensor, the temperature sensor, the tire ID capacity and/or the centerline length sensor may be incorporated into the single sensor unit 26, or may be incorporated into multiple units. For the purpose of convenience, reference herein shall be made to a single sensor unit 26.

With reference to FIG. 4, the sensor unit 26 includes transmission means 34 for sending the measured parameters of tire pressure 38, tire temperature 40 and centerline length 28, as well as tire ID information 42, to a processor 36. The transmission means 34 may include an antenna for wireless transmission or wires for wired transmission. The processor 36 may be integrated into the sensor unit 26, or may be a remote processor, which may be mounted on the vehicle 14 or be cloud-based. For the purpose of convenience, the processor 36 will be described as a remote processor mounted on the vehicle 14, with the understanding that the processor may alternatively be cloud-based or integrated into the sensor unit 26.

Aspects of the tire wear state estimation system 10 preferably are executed on the processor 36, which enables input of data from the sensor unit 26 and execution of specific analysis techniques and algorithms, to be described below, which are stored in a suitable storage medium and are also in electronic communication with the processor.

In this manner, the sensor unit 26 measures the tire pressure 38, tire temperature 40 and centerline length 28, and transmits these measured parameters to the processor 36 with the tire ID information 42. The tire ID information 42 enables a tire construction database 44 to be electronically accessed 46. The tire construction database 44 stores tire construction data 50, which will be described in greater detail below. The database 44 is in electronic communication with the processor 36 and may be stored on the processor, enabling transmission 48 of the tire construction data 50 to the processor 36.

The tire ID information 42 may be correlated to specific construction data 50 for each tire 12, including: the tire type; tire model; size information, such as rim size, width, and outer diameter; manufacturing location; manufacturing date; a treadcap code that includes or correlates to a compound identification; a mold code that includes or correlates to a tread structure identification; a tire footprint shape factor (FSF), a mold design drop; a tire belt/breaker angle; and an overlay material. The tire ID information 42 may also correlate to a service history or other information to identify specific features and parameters of each tire 12, as well as mechanical characteristics of the tire, such as cornering parameters, spring rate, load-inflation relationship, and the like.

An analysis module 52 is stored on the processor 36, and receives the tire pressure 38, tire temperature 40, tire centerline length 28, tire ID information 42, and tire construction data 50. The analysis module 52 analyzes these inputs to generate an estimate of the tire wear state, indicated at 54, as will be described in greater detail below.

Figure 5:
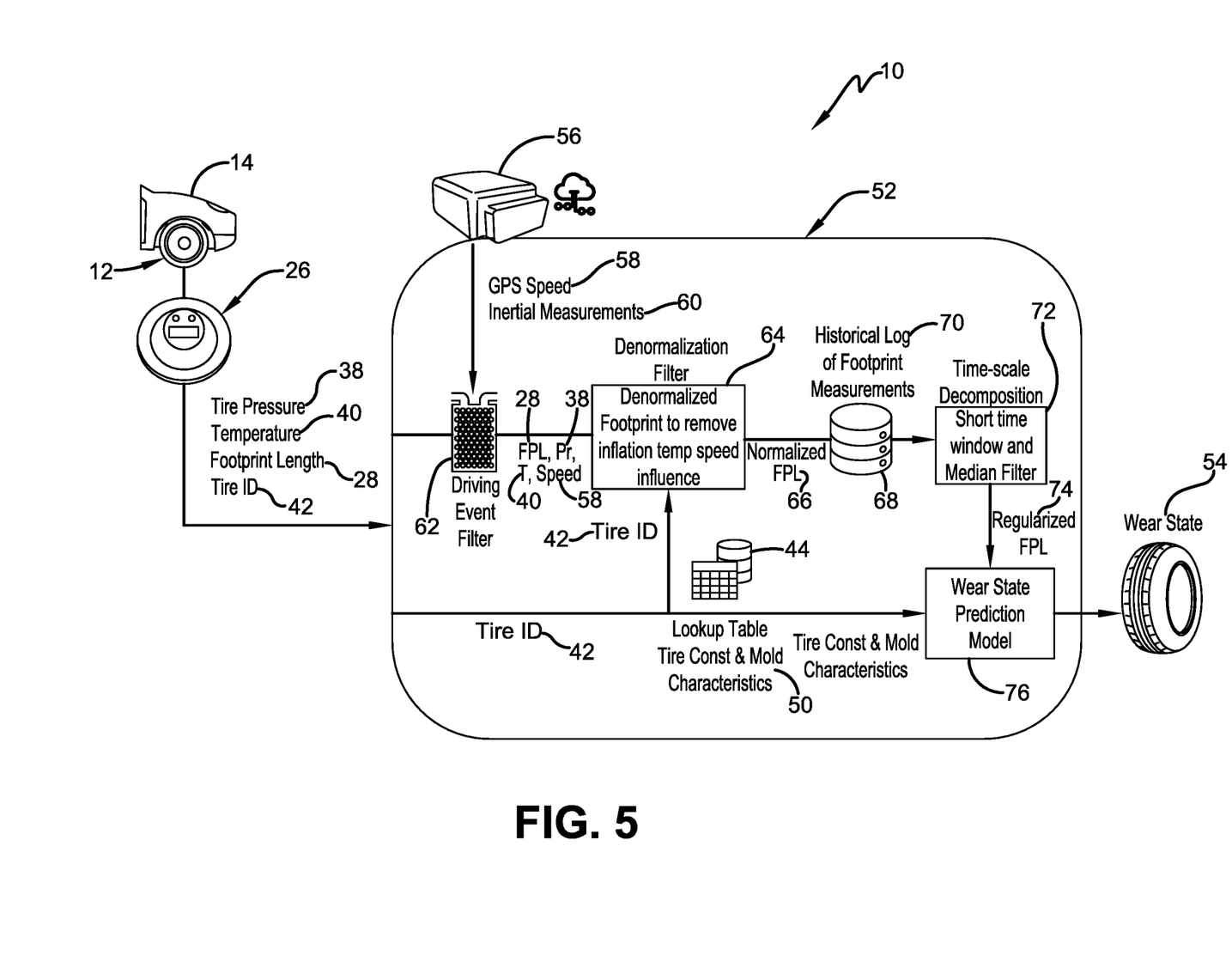
FIG. 5 is a schematic diagram showing aspects of the analysis module of the tire wear state estimation system shown in FIG. 4.

Turning to FIG. 5, the analysis module 52 receives the tire-based data inputs of tire pressure 38, tire temperature 40, centerline length 28 and tire ID information 42. The analysis module 52 preferably also receives data from a vehicle-mounted collection unit 56. The data from the vehicle-mounted collection unit 56 includes vehicle speed 58 as calculated from global positioning system (GPS) data, and inertial measurements 60 for the vehicle 14 from an accelerometer.

An event filter 62 is applied to the data received from the vehicle-mounted collection unit 56. More particularly, vehicle conditions are reviewed in the event filter 62, including the measured vehicle speed 58 from GPS data and the inertial measurements 60. These measured values are compared to threshold values, including upper and lower limits. If the measured values are outside of the threshold values, the system 10 does not proceed, as the vehicle 14 is likely to be operating outside of normal or predictable conditions. If the measured values are within the threshold values, the measured data of tire pressure 38, tire temperature 40, centerline length 28 and vehicle speed 58 are sent to a denormalization filter 64.

The denormalization filter 64 is employed to account for and eliminate the effect of inflation pressure 38, temperature 40 and vehicle speed 58 on the centerline length 28 of the tire 12. In the denormalization filter 64, a pre-trained regression model is used to account for the effects of inflation pressure 38, temperature 40 and vehicle speed 58. Regardless of the vehicle and tire operating conditions, the centerline length 28 is regressed to a pre-defined nominal condition, that is, a pre-defined inflation pressure 38, temperature 40 and vehicle speed 58.

In addition, the fastest wearing portion of the tire 12 may not always be at the centerline 30 (FIG. 2). For many tires, the fastest wear may be at a shoulder 88. However, the difference between the wear rate of the tire 12 at the centerline 30 and at the shoulder 88 typically is dependent upon the tire construction data 50, including the tire footprint shape factor (FSF), mold design drop, tire belt/breaker angle and/or the overlay material. The tire construction data 50 from the tire construction database 44 thus is input into the denormalization filter 64, and is used in conjunction with the centerline length measurement 28 from the sensor unit 26 to estimate a length 90 at the shoulder 88, which may be the fastest-wearing portion of the tread 20. A technique employing the tire footprint shape factor is described in greater detail in an Application titled "Tire Wear State Estimation System and Method Employing Footprint Shape Factor", which is being filed concurrently with the instant Application by the same Assignee, The Goodyear Tire & Rubber Company, and which is incorporated herein in its entirety.

The denormalization filter 64 generates a normalized footprint length 66. Because the centerline length 28 of the tire 12 may also be affected by the vehicle load, the effect of load on the normalized footprint length 66 must be accounted for and eliminated. To eliminate the effect of load on the normalized footprint length 66, a historical footprint measurement database 68 is accessed. The historical footprint measurement database 68 is in electronic communication with the processor 36 and may be stored on the processor, and contains a historical log of footprint measurements 70. The normalized footprint length 66 is correlated to the historical log 70 and an average of the values is taken.

The average of the values is applied to a time filter 72. The time filter 72 accounts for time-scale decomposition of the tire 12. More particularly, the time filter 72 accounts for and eliminates bias due to factors or parameters that may affect the tire 12 over time, and which are not among the above-described measured parameters. The technique employed in the time filter 72 is described in greater detail in an Application titled "Method for Extracting Changes in Tire Characteristics", which is being filed concurrently with the instant Application by the same Assignee, The Goodyear Tire & Rubber Company, and which is incorporated herein in its entirety.

The time filter 72 yields a regularized footprint length 74 for the tire 12. The regularized footprint length 74 is input into a prediction model 76 to generate the estimated wear state 54 for the tire 12. The prediction model 76 preferably is a non-linear regression model. By way of background, non-linear regression models are a form of regression analysis in which observational data are modeled by a function that is a nonlinear combination of the model parameters, and depends on one or more independent variables. Examples of non-linear regression models that may be employed in the prediction model 76 include a Random Forest Regressor, an XgBoost Regressor, and a CatBoost Regressor.

In this manner, the tire-based measured values of centerline length 28, pressure 38 and temperature 40 are input into the analysis module 52, along with the tire ID information 42 and the vehicle-based measured values of speed 58 and inertia 60. The normalized footprint length 66 is generated after the denormalization filter 64 is applied, and the regularized footprint length 74 is generated after the normalized footprint length is correlated to the historical log 70 and an average of the values is applied to the time filter 72. The prediction model 76 employs the regularized footprint length 74 to estimate the wear state 54 of the tire 12.

Figure 6:
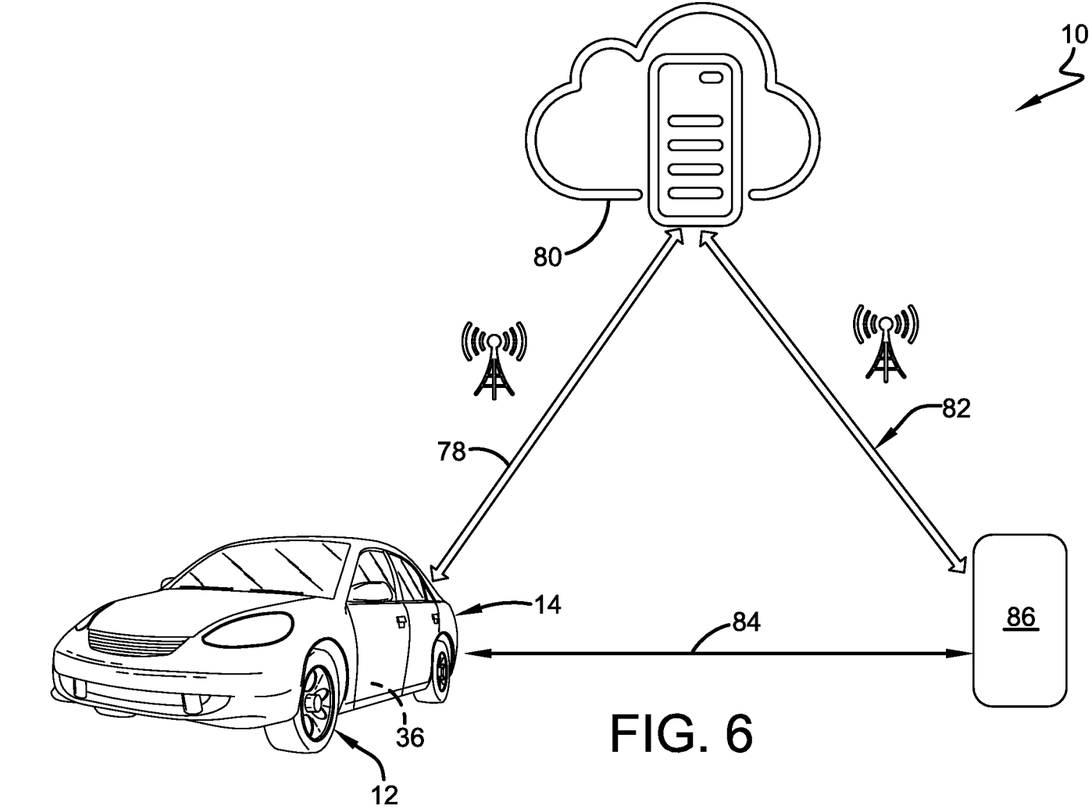
FIG. 6 is a schematic diagram of the vehicle shown in FIG. 1 with a representation of data transmission to a cloud-based server and to a user device.

Referring to FIG. 6, when the wear state 54 is estimated for each tire 12, the data may be wirelessly transmitted 78 from the processor 36 on the vehicle 14 to a remote processor, such as a processor in a cloud-based server 80. The wear state estimation 54 may be stored and/or remotely analyzed, and may also be wirelessly transmitted 82 to a display device 84 for a display that is accessible to a user of the vehicle 14, such as a smartphone. Alternatively, the wear state estimation 54 may be wirelessly transmitted 86 from the processor 36 directly to the display device 84.

In addition, the tire wear state estimation 54 may be compared in the processor 36 to a predetermined wear limit. If the wear state estimation 54 is below the limit of acceptable remaining depth of the tread 20, a notice may be transmitted to the display device 84. The tire wear state estimation system 10 thus may provide notice or a recommendation to a vehicle operator that one or more tires 12 are worn and should be replaced.

The tire wear state estimation system 10 may also transmit or communicate the tire wear state estimation 54 to a service center or a fleet manager. Moreover, the tire wear state estimation system 10 may transmit or communicate the tire wear state estimation 54 to an electronic control unit of the vehicle 14 and/or a vehicle control system, such as the braking system and/or the suspension system, to increase the performance of such systems.

In this manner, the tire wear state estimation system 10 of the present invention estimates the wear state of the tire 12 by measuring the tire-based parameters of footprint centerline length 28, pressure 38 and temperature 40, measuring the vehicle-based parameters of speed 58 and inertia 60, and incorporating tire ID information 42. The system 10 inputs these parameters and information into an analysis module 52, which provides an accurate and reliable estimation of the tire wear state 54. The tire wear state estimation system 10 of the present invention thus provides an independent, standalone system that does not need to be integrated into the electronic systems of the vehicle, including the CAN bus system.

The present invention also includes a method of estimating the wear state of a tire 12. The method includes steps in accordance with the description that is presented above and shown in FIGS. 1 through 6.

It is to be understood that the structure and method of the above-described tire wear state estimation system may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire wear state estimation system comprising:
   a vehicle;
   a tire supporting the vehicle;
   a sensor unit being mounted on the tire, the sensor unit including:
      a footprint centerline length measurement sensor to measure a centerline length of a footprint of the tire;
      a pressure sensor to measure a pressure of the tire;
      a temperature sensor to measure a temperature of the tire; and
      electronic memory capacity for storing identification information for the tire;
   a processor in electronic communication with the sensor unit, the processor receiving the measured centerline length, the measured pressure, the measured temperature and the identification information;
   a tire construction database storing tire construction data, the tire construction database being in electronic communication with the processor, wherein the identification information is correlated to the tire construction data;
   an analysis module being stored on the processor and receiving the measured centerline length, the measured pressure, the measured temperature, the identification information, and the tire construction data as inputs; and
   the analysis module including a prediction model to generate an estimated wear state for the tire from the inputs.

2. The tire wear state estimation system of claim 1, wherein the analysis module further comprises a denormalization filter receiving the measured centerline length, the measured pressure, the measured temperature, the identification information, and the tire construction data as inputs, and generating a normalized footprint length.

3. The tire wear state estimation system of claim 2, wherein the analysis module further comprises a historical footprint measurement database storing a historical log of footprint measurements, the historical footprint measurement database being in electronic communication with the processor, and wherein the normalized footprint length is correlated to the historical log of footprint measurements, and an average of the values is taken.

4. The tire wear state estimation system of claim 3, wherein the analysis module further comprises a time filter, wherein the average of the values is applied to the time filter to account for time-scale decomposition of the tire, the time filter yielding a regularized footprint length for the tire.

5. The tire wear state estimation system of claim 4, wherein the regularized footprint length is input into the prediction model for estimating a remaining tread depth.

6. The tire wear state estimation system of claim 1, further comprising a vehicle-mounted collection unit to collect measurements of a speed of the vehicle and an inertia of the vehicle;
   wherein the analysis module receives the speed of the vehicle and the inertia of the vehicle as inputs; and
   the analysis module includes an event filter, wherein the speed of the vehicle and the inertia of the vehicle are compared to threshold values before further analysis is performed by the analysis module.

7. The tire wear state estimation system of claim 6, wherein the speed of the vehicle is calculated from global positioning system data and the inertia of the vehicle is measured with an accelerometer.

8. The tire wear state estimation system of claim 1, wherein the pressure sensor, the temperature sensor, the centerline length sensor and the memory capacity for storing tire identification information are incorporated into a single unit.

9. The tire wear state estimation system of claim 1, wherein the pressure sensor, the temperature sensor, the centerline length sensor and the memory capacity for storing tire identification information are incorporated into multiple units.

10. The tire wear state estimation system of claim 1, wherein the sensor unit includes transmission means, the transmission means including at least one of an antenna for wireless transmission and wires for wired transmission.

11. The tire wear state estimation system of claim 1, wherein the tire construction data includes at least one of a tire type, tire model, size information, manufacturing location, manufacturing date, treadcap code, mold code, tire footprint shape factor, mold design drop, tire belt/breaker angle, and overlay material.

12. The tire wear state estimation system of claim 1, wherein the prediction model is a non-linear regression model.

13. The tire wear state estimation system of claim 12, wherein the prediction model includes at least one of a Random Forest Regressor, an XgBoost Regressor, and a CatBoost Regressor.

14. The tire wear state estimation system of claim 1, wherein the processor includes transmission means to transmit the wear state estimation to at least one of a display device, a service center, a fleet manager and a vehicle control system.

15. A method for estimating the wear state of a tire supporting a vehicle, the method comprising the steps of:
mounting a sensor unit on the tire;
measuring a footprint centerline length of the tire with the sensor unit;
measuring a pressure of the tire with the sensor unit;
measuring a temperature of the tire with the sensor unit;
storing identification information for the tire in the sensor unit;
receiving the measured centerline length, the measured pressure, the measured temperature and the identification information in a processor;
storing tire construction data in a tire construction database that is in electronic communication with the processor;
correlating the identification information to the tire construction data;
storing an analysis module on the processor;
receiving the measured centerline length, the measured pressure, the measured temperature, the identification information, and the tire construction data as inputs in the analysis module; and
generating an estimated wear state for the tire from the inputs with a prediction model in the analysis module.

16. The method for estimating the wear state of a tire supporting a vehicle of claim 15, further comprising the steps of:
providing a denormalization filter in the analysis module;
receiving the measured centerline length, the measure pressure, the measured temperature, the identification information, and the tire construction data as inputs in the denormalization filter; and
generating a normalized footprint length with the denormalization filter.

17. The method for estimating the wear state of a tire supporting a vehicle of claim 16, further comprising the steps of:
storing a historical log of footprint measurements on a historical footprint measurement database being in electronic communication with the processor; and
correlating the normalized footprint length to the historical log of footprint measurements, and taking an average of the values.

18. The method for estimating the wear state of a tire supporting a vehicle of claim 17, further comprising the steps of:
providing a time filter in the analysis module; and
applying the average of the values to the time filter to yield a regularized footprint length for the tire.

19. The method for estimating the wear state of a tire supporting a vehicle of claim 18, further comprising the step of inputting the regularized footprint length into the prediction model.

20. The method for estimating the wear state of a tire supporting a vehicle of claim 15, further comprising the steps of:
providing a vehicle-mounted collection unit to collect measurements of a speed of the vehicle and an inertia of the vehicle;
receiving the speed of the vehicle and the inertia of the vehicle as inputs into the analysis module;
providing an event filter in the analysis module; and
comparing the speed of the vehicle and the inertia of the vehicle to threshold values with the event filter before performing further analysis with the analysis module.

* * * * *